T. S. Lewis,
Green Corn Knife.

No. 94,013.            Patented Aug. 24, 1869.

Witnesses:
Henry C. Houston,
W. F. Henry

Inventor:
T. S. Lewis
per. William Henry Cliff
atty

United States Patent Office.

T. S. LEWIS, OF PORTLAND, MAINE.

*Letters Patent No. 94,013, dated August 24, 1869.*

---

IMPROVED MACHINE FOR REMOVING GREEN CORN FROM THE COB.

---

The Schedule referred to in these Letters Patent and making part of the same.

---

*To all whom it may concern:*

Be it known that I, T. S. LEWIS, of Portland, in the county of Cumberland, and State of Maine, have invented a new and useful Machine for Removing Green Corn from the Cob: and I hereby declare the following to be a full, clear, and exact description thereof, which will enable others to make and use my invention, reference being had to the accompanying drawings, forming part of this specification, in which—

Same letters show like parts.

The object of my invention is to produce a machine for removing green corn from the cob, and also for taking with it that portion of the milk in the kernels which may remain on the cob after the kernels have been cut from the same.

My invention consists—

First, of a device for operating a plunger and follower, in connection with a receptacle for the corn-ears and the cutters.

Second, it consists of an adjustable cutter-frame, with gauged knives thereon.

Third, it consists of the adjustable scraper or scrapers.

The operating parts of my invention are placed upon a convenient or proper frame, A.

Figure 1:
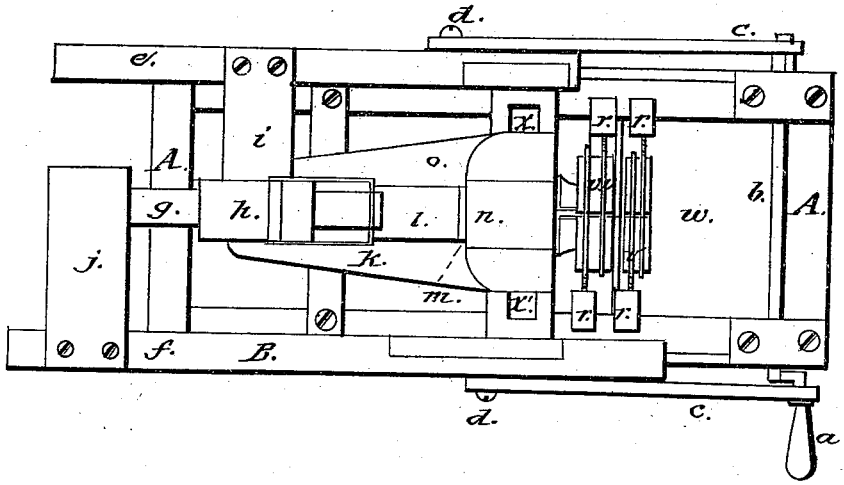
Figure 1 is a top plan of my machine, with the cutter-frame removed.

On the top of this frame, and moving on proper ways, or tracks, is the carriage B, which has imparted to it an alternate forward and retrograde movement, by means of the crank or other power $a$, the crank-shaft $b$, and connecting-rods $c$, attached to the sliding frame at $d$, all being shown in fig. 1.

The two sides, $e\ f$, of the sliding frame B move unequally, which is accomplished by the different lengths of the cranks on shafts $b$, from which, by the connecting-rods $c$, as aforesaid, motion is communicated to the sliding frame B.

$f$ travels further and more rapidly than $e$. $f$ carries the plunger $g$, attached to the piece $j$.

$e$ carries the follower $h$, attached by the piece $i$.

$k$ shows the hopper, or receptacle for the ears of corn.

$l$ is a concave, or groove in the plate $o$, leading to the cutter $n$.

The ears are forced along the groove $l$ to the edge of the cutter $n$, by means of the follower $h$ and plunger $g$, which latter works through a hole in the follower $h$, and through an aperture in the end of the hopper $k$, as illustrated in fig. 1.

At every motion, therefore, of the plunger $g$, an ear is forced against the edge of the cutter $n$, by which the kernels are removed from the lower half thereof, the kernels dropping down, through the space $m$, to a proper receptacle below the said edge of $n$ being just enough elevated above $l$ to cut and remove sufficient of the said kernels.

The cob is then, by the plunger $g$, forced along the groove in $n$. This groove is illustrated in fig. 1.

Figure 2:
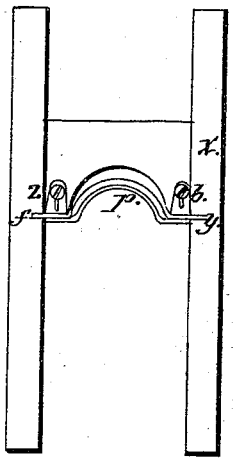
Figure 2 is a detail front elevation of the cutter-frame.

The kernels on the upper half of the ear are removed by the cutter $p$, fig. 2, (which device will be hereafter explained,) at the same time.

The end of the follower $h$ and plunger $g$ are slightly recessed, in order to receive the stalk or butt of the ear and retain the same.

In preserving corn in accordance with the approved process, more especially according to that patented by Isaac Winslow, it is indispensable to remove as much of the milk of the kernels from the cob as possible, in order to preserve the said kernels in their own juices, and in removing the kernels from the cob, there is always left upon the cob a small cup or hull, in which much of the milk of the grain resides.

Figure 3:
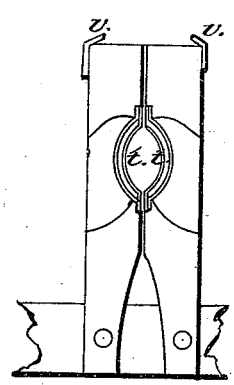
Figures 3 and 4 are detail front elevations of the scrapers.
Figure 4:
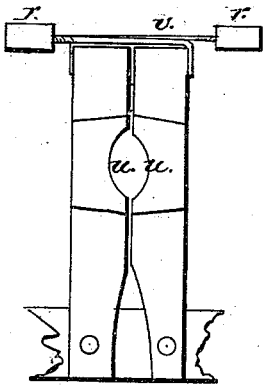

In view of these facts, I provide the scrapers, figs. 3 and 4, which consist each of two upright arms, rising from a cross-piece of the frame of the machine, and so pivoted thereto as that they will open and shut, the pieces moving in vertical planes, as will be understood from the said figs 3 and 4. Fig. 3 is provided with the cutters, or scrapers $t$, and fig. 4 with those shown at $u$.

The pressure these will exert upon the cob, as it is forced through them by the plunger $g$, is regulated by the adjustable weights $r$ on the arms $v$.

After the cutting is performed, the cob being then forced through one or both of these scrapers, the milk is thus removed from the portions of the kernels remaining on the cob, and runs into the receptacle for the kernels; and this without any portion of the cob being removed by the cutters, or the hulls in which the said milk may be.

After being forced through these, the cobs drop down at $w$.

$x$ is the removable and adjustable cutter-frame, fitting into the spaces $x'$.

The knife $p$ is attached to the carrier $y$, is placed, when in position, directly over the cutter $n$, and is adjustable to the different sizes of ears, by the projections, set-screws, and slots, as illustrated at $z$.

The operation of my machine has been sufficiently indicated in the foregoing description.

It is evident that the knife $p$ may be made fixed, and $n$ removable.

What I claim as my invention, and desire to secure by Letters Patent, is—

1. The sliding carriage B, composed of the parts $e$ $f$, and carrying the follower $h$ and plunger $g$, in connection with the cutters $n\ p$, as herein described.

2. The cutting frame $x$, with its adjustable cutter $p$, in combination with the adjustable scraping devices $t$ $u$, constructed and arranged to operate as herein described, for the purpose specified.

3. The sliding carriage B $f\ e$, with the follower and plunger, in connection with the adjustable scrapers $t$ $u$, as herein described.

4. The hopper $k$, in combination with the sliding carriage B $f\ e$, follower $h$, plunger $g$, and knives $n\ p$, constructed and arranged as herein described, for the purpose specified.

T. S. LEWIS.

Witnesses:
W. H. CLIFFORD,
WM. FRANKLIN SEAVEY.